United States Patent [19]
Di Grazia

[11] 3,924,558
[45] Dec. 9, 1975

[54] TRUCK DOOR POSITION INDICATOR
[76] Inventor: Alfred Di Grazia, 17588 Rainier Ave., Hayward, Calif. 94541
[22] Filed: Oct. 21, 1974
[21] Appl. No.: 516,455

[52] U.S. Cl............ 116/28 R; 116/124 R; 180/111; 180/112
[51] Int. Cl.²........................................... B60Q 9/00
[58] Field of Search................ 116/52, 28 R, 124 R; 180/112, 111, 82

[56] References Cited
UNITED STATES PATENTS
1,718,674  6/1929  Wheeler........................... 116/124 R
1,727,838  9/1929  Miyaoka........................... 116/124 R FOREIGN PATENTS OR APPLICATIONS
536,561  5/1941  United Kingdom............. 116/124 R

*Primary Examiner*—Jerry W. Myracle
*Assistant Examiner*—Marcus S. Rasco

[57] ABSTRACT

A door position indicator mounted on the frame of the rear pull-down door of a truck is exposed to the view of a driver via his rear view mirror when the door is in its up or open position, and is retracted from such view in response to pulling down of the door to latching position. Thus, should the door become unlatched or occupies a partially or fully open position while the truck is in motion, the indicator will be exposed to view of the driver who can then remedy the situation.

9 Claims, 4 Drawing Figures

TRUCK DOOR POSITION INDICATOR

My invention relates to trucks and more particularly to trucks of large capacity having a pull-down type door at the rear.

Such trucks have considerable capacity and are loaded with various types of merchandise for movement over considerable distances. After loading, the door is pulled down to its closed position and latched to guard against loss of contents during movement.

Often, the driver may overlook closing of the door or may fail to adequately latch the door in its closed position, and he would not be aware of the situation during travel, for the door being at the rear of the truck, would not be within his view. Under the circumstances, merchandise may be lost from the truck while the truck was in motion. And if the truck were parked without knowledge of the open condition of the rear door, the contents would be exposed to thievery.

Among the objects of the present invention are:
1. To provide a novel and improved indicator to enable the driver of a truck to become aware of the condition of the rear door of the truck;
2. To provide such indicator which is extremely simple and readily applicable to a truck;
3. To provide such an indicator which can be viewed by the driver through his rear view mirror;

Additional objects of my invention will be brought out in the following description of a preferred embodiment of the same, taken in conjunction with the accompanying drawings wherein.

Figure 3:
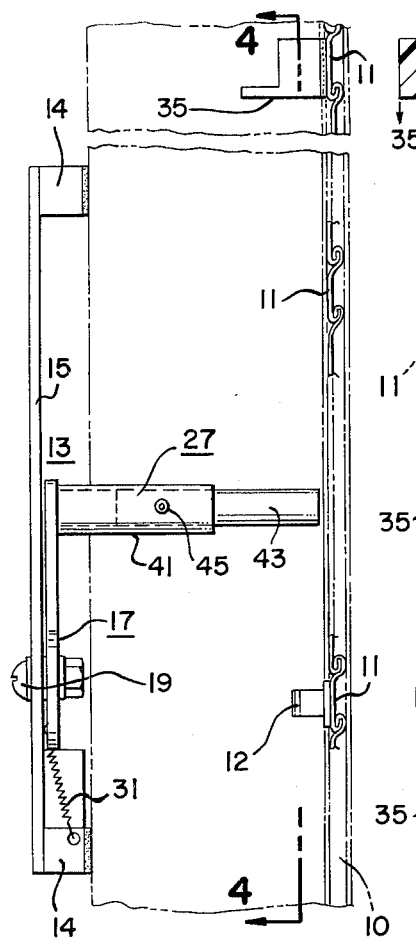
FIG. 3 is a view taken in the plane 3—3 of FIG. 2 and showing the proximate portion of the truck body structure in phantom.
Figure 4:
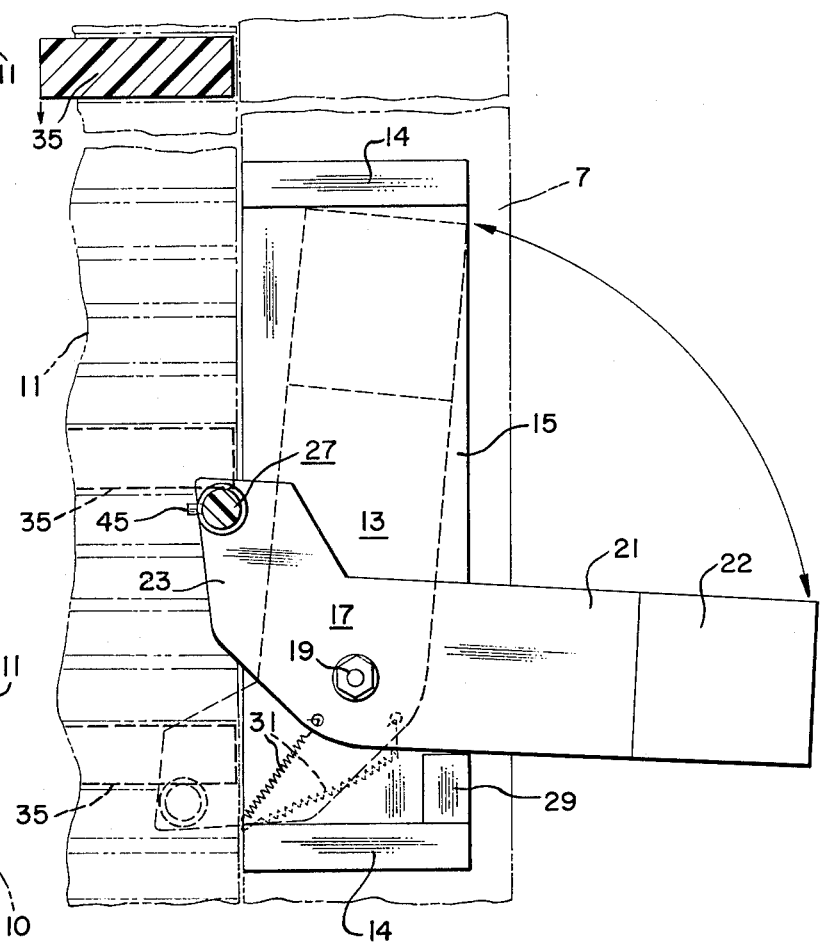
FIG. 4 is a view taken in the plane 4—4 of FIG. 3, and depicting in phantom, the manner in which the indicator functions in response to closing of the door.
Figure 2:
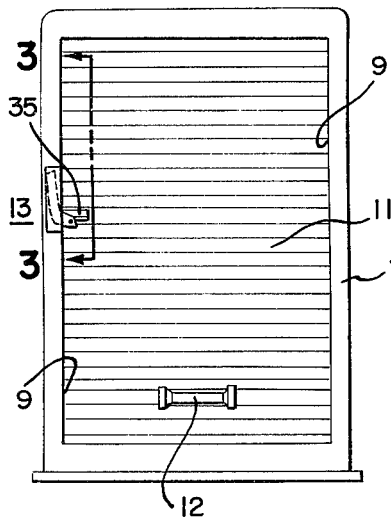
FIG. 2 is a view of the rear end of the truck body, depicting a door of the pull-down type, and the mounting of the indicator with relationship thereto.
Figure 1:
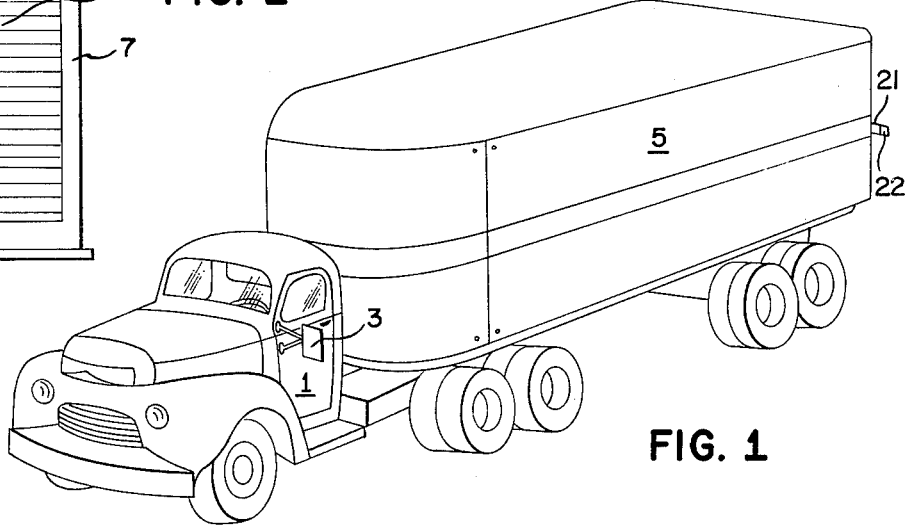
FIG. 1 is a view depicting a truck of the type to which the present invention primarily relates, and illustrates the application of the invention thereto.

Broadly speaking, the present invention contemplates an indicator observable by a truck driver via his rear view mirror, for indicating an open rear door of a truck body and means responsive to closing of such door for removing said indicator from view.

Referring to the drawings for details of the invention in its preferred form, the invention has been illustrated as applied to a truck of the type having an independent cab 1 with a rear view mirror 3 and behind the cab, a large truck body 5 having a rear end wall 7 provided with a door opening which is bordered adjacent its vertical edges 9 by tracks 10 in which a door 11 of the pull-down type is adapted to ride, in moving from its up or open position, to a down or closed position, where it may be latched. The door may be provided with a handle 12 for raising or lowering the same.

The indicator device 13 involves a mounting plate 15 having means at each end such as a mounting block 14 for mounting the plate in spaced relationship to a wall such as the rear of the truck, adjacent the door opening.

To this plate is pivotally secured, an indicating arm 17, the pivotal mounting therefor being effected by a rivet or machine screw 19 at an intermediate point of the arm to divide the arm into two sections. One section 21 when in a horizontal position, being of a length to extend outwardly beyond the proximate side wall of the truck body for exposure to the view of the driver, by way of the rear view mirror. To the end of this exposed section may be affixed a red patch 22 or other clearly observable means to enhance visibility.

The other section 23 of the indicating arm may be angularly disposed with respect to the first section, but in any event, should be of sufficient length to extend inwardly beyond the proximate door track, when the section carrying the patch is in its horizontal position.

To the end of this other section thus exposed beyond the proximate door track, a stem 27 is affixed, to extend toward but terminating short of the door when in its closed position.

If the outwardly directed portion of the arm outweighs the inwardly directed portion plus the stem, the outwardly directed portion will normally swing toward its horizontal position, which may be predetermined by applying a stop 29 to the plate at the appropriate location.

However, to avoid the necessity of assuring such unbalance in the relative weights of the two arm sections, a light coil spring 31 anchored under tension at one end to the proximate mounting block at the lower end of the plate, and at its other end to an appropriate point on the indicator arm, will serve to spring bias the indicator section of the arm to its horizontal position. Then by applying downward pressure to the stem 27, the indicator arm may be pivotally rotated to swing the horizontal section to a vertical non-observable position with respect to the driver.

Such movement of the indicator arm may be effected automatically in response to closing of the rear door of the body by applying an actuator 35 to the surface of the door, in position to strike the stem 27 as the door is lowered.

Such striking of the stem should preferably be timed to occur just before the door reaches its lowermost or latching position, and such location of the actuator can be readily determined by first latching the door in its closed position, then manually swinging the indicator arm with the outboard section vertically disposed. The actuator is then affixed to the door in proximate contact with the stem. Thereafter, should the door be left in open condition or the door be unsecurely latched and should inadvertently partially open during travel, the indicator section of the arm, in either event, will occupy its outward position, which will bring it within view of the driver via his rear view mirror, and thus be observable by him.

To prepare the device for ready mounting, both mounting blocks may be covered with contact cement and protected until ready for use, by a layer of removable paper. The actuator may similarly be prepared. No tools therefore, will be required for affixing the device, which can be installed quickly and effectively.

To accommodate the device to situations where the space in between the rear surface of the truck body and the exposed surface of the door might vary, the stem 27 may be rendered adjustable by making it of two telescopic sections 41, 43 with a set screw 45 mounted in the outer section to stabilize an adjustment after it has been made.

The material from which the device is made is not critical, but it is preferably fabricated from plastic which is light and weather proof.

I claim:

1. A door position indicator for a door of the pull-down type installed in tracks bordering the vertical edges of a door opening in the rear end wall of the body of a truck having a driver's compartment and a rear view mirror, said door position indicator comprising indicator means, means for mounting said indicator means adjacent the rear wall of such truck body, means, when said door position indicator is so installed, for normally urging a section of said indicator means to a position lying within view of a driver via said rear view mirror with said door in its open position to indicate an open position of such door, and means responsive to the closing of such door for removing and holding said indicator means from such view of a driver, while said door remains closed.

2. A door position indicator in accordance with claim 1, characterized by said indicator means including an indicator arm of a length adapted to extend outwardly beyond the side wall of such truck, body when said door position indicator is installed on such truck body.

3. A door position indicator in accordance with claim 2, characterized by said indicator arm being pivotally mounted at an intermediate point thereof to a mounting plate, to create a section adapted to extend inwardly beyond the proximate track, when installed, and said means adapted to respond to closing of such door including a stem extending from said inwardly extendable section of said indicator arm toward the path of movement of such door when said door position indicator is installed on such truck body.

4. A door position indicator in accordance with claim 3, characterized by an actuator adapted for mounting on such door for movement with said door in line with the installed position of said stem, to engage and actuate such stem as such door moves toward its closed position.

5. A door position indicator in accordance with claim 3, characterized by means normally biasing said arm to what would be its observable position when said plate is so mounted alongside one of such tracks.

6. A door position indicator in accordance with claim 2, characterized by said means for mounting said indicator arm including a plate, means securing said arm to said plate, and means for adhesively securing said plate to a surface such as the end wall of such truck body.

7. A door position indicator in accordance with claim 4, characterized by means affixing said pivotally mounted indicator arm to the rear end wall of said truck body with said inwardly extending section of said arm extending beyond said proximate track and means affixing said actuator on said pull-down door in line with said stem.

8. In combination, a truck having a truck body with a rear wall including a door of the pull down type, a driver's compartment toward the front of said truck and a rear view mirror on said truck enabling a driver to view toward the rear of said truck, and a door position indicator mounted on said body, said door position indicator including an indicator means to indicate to a driver via said rear view mirror, an open condition of said door, means in the open condition of said door, normally rendering said indicator means observable to such driver via said rear view mirror, and means responsive to closing of said door for rendering said indicator means ineffective to alert such driver and adapted to restore said indicator means upon a subsequent opening of said door to enable said indicator means to be restored to its observable condition.

9. The combination of a truck and door position indicator in accordance with claim 8 characterized by said door position indicator comprising a mounting plate affixed to said truck body, and said indicating means including an indicator pivotally mounted at an intermediate point thereof to said mounting plate with a portion of said indicating arm in the open condition of said door, extending to within view of a driver via said rear view mirror while another portion thereof extends in the path of movement of said door, whereby in response to closing of said door, said viewable portion of said indicating arm will be substantially removed from view of such driver and restored to such view upon subsequent opening of said door.

* * * * *